US009536426B2

(12) United States Patent
Schmitt et al.

(10) Patent No.: US 9,536,426 B2
(45) Date of Patent: Jan. 3, 2017

(54) SYSTEMS AND METHODS FOR DETERMINING A SPEED LIMIT VIOLATION

(75) Inventors: Daniel P. Schmitt, San Diego, CA (US); Arlene Hasegawa, San Diego, CA (US); Stephen Lachmayr, San Diego, CA (US)

(73) Assignee: Omnitracs, LLC, Dallas, TX (US)

(*) Notice: Subject to any disclaimer, the term of this patent is extended or adjusted under 35 U.S.C. 154(b) by 593 days.

(21) Appl. No.: 12/428,574

(22) Filed: Apr. 23, 2009

(65) Prior Publication Data

US 2010/0271196 A1 Oct. 28, 2010

(51) Int. Cl.
*B60Q 1/54* (2006.01)
*G08G 1/052* (2006.01)

(52) U.S. Cl.
CPC .................................... *G08G 1/052* (2013.01)

(58) Field of Classification Search
USPC ......................................................... 340/466
See application file for complete search history.

(56) References Cited

U.S. PATENT DOCUMENTS

| | | | | |
|---|---|---|---|---|
| 6,462,675 | B1 * | 10/2002 | Humphrey | G08G 1/052 340/441 |
| 6,633,811 | B1 * | 10/2003 | Aumayer | B60K 31/185 180/170 |
| 6,691,015 | B1 * | 2/2004 | Levine | 701/70 |
| 7,356,392 | B2 | 4/2008 | Hubbard et al. | |
| 2002/0027512 | A1 * | 3/2002 | Horita et al. | 340/988 |
| 2002/0173881 | A1 * | 11/2002 | Lash et al. | 701/1 |
| 2004/0068653 | A1 * | 4/2004 | Fascenda | H04L 9/0844 713/168 |
| 2004/0236476 | A1 * | 11/2004 | Chowdhary | 701/1 |
| 2005/0073399 | A1 * | 4/2005 | Tsuruhara et al. | 340/441 |
| 2007/0067086 | A1 * | 3/2007 | Rothschild | 701/93 |
| 2007/0115113 | A1 | 5/2007 | Wang | |
| 2007/0188348 | A1 * | 8/2007 | Bauer | G08G 1/162 340/905 |
| 2009/0024309 | A1 * | 1/2009 | Crucs | G08G 1/015 701/118 |
| 2009/0069953 | A1 * | 3/2009 | Hale et al. | 701/1 |

(Continued)

FOREIGN PATENT DOCUMENTS

| | | |
|---|---|---|
| WO | 2005109368 | 11/2005 |
| WO | WO2005109368 | 11/2005 |

OTHER PUBLICATIONS

International Search Report, PCT/US2010/032199 International Searching Authority, European Patent Office, Aug. 5, 2010.

(Continued)

*Primary Examiner* — Ojiako Nwugo
(74) *Attorney, Agent, or Firm* — Arent Fox LLP

(57) ABSTRACT

Systems and methods to determine a speed limit violation by a vehicle. A locator device coupled to the vehicle receives GPS location coordinates from a satellite. The systems and methods determine the speed of the vehicle using the received coordinates or the functions of an engine control module. The speed limit of the segment of roadway on which the vehicle is traveling is identified based on the coordinates, and the vehicle speed is compared to the speed limit to determine whether the vehicle is violating the speed limit for the segment of roadway. The systems and methods alert any interested parties, such as the vehicle driver or a fleet manager, of the speed limit violation.

65 Claims, 6 Drawing Sheets

(56) References Cited

U.S. PATENT DOCUMENTS

| | | | | |
|---|---|---|---|---|
| 2009/0243883 | A1* | 10/2009 | Simon .............. | G08G 1/096716<br>340/905 |
| 2010/0299042 | A1* | 11/2010 | Brierly .................. | B60W 50/12<br>701/93 |

OTHER PUBLICATIONS

Written Opinion, PCT/US2010/032199, International Searching Authority, European Patent Office, Aug. 5, 2010.
International Search Report and Written Opinion—PCT/US2010/032199, International Search Authority—European Patent Office—Aug. 5, 2010.
Canadian Office action mailed Oct. 7, 2014 in Canadian Patent Application No. 2,757,850.

* cited by examiner

SYSTEMS AND METHODS FOR DETERMINING A SPEED LIMIT VIOLATION

FIELD

This invention generally relates to systems and methods for determining a speed limit violations using location coordinates.

BACKGROUND

A Global Positioning System (GPS) receiver can estimate its current location by receiving location coordinates from existing GPS satellites. For example, a GPS receiver coupled to a vehicle can receive location coordinates to estimate the location of the vehicle as well as provide the location of the vehicle to the driver. The speed of the GPS receiver and associated component coupled to the GPS receiver such as, for example, a vehicle, can be calculated using conventional methods such as computing movement per unit time, computing the doppler shift in the pseudo range signals from the satellites, using algorithms in the Kalman filter, and using other algorithms. The location and speed data can be communicated over wireless or cellular communication networks between GPS receivers and base receivers or stations, or other hardware, software, and logic components.

Data associated with traversable roadways can be accessed, stored, or modified by GPS receivers or by other hardware, software, and logic. The associated data can comprise locations of roadways, intersections, and the direction of traffic flow. The associated data, along with the vehicle speed and location can be provided to a user of the GPS receiver such as, for example, a driver of the vehicle traveling on the roadway. For example, a GPS locator device or receiver can be equipped with a screen to visually display a map with the vehicle's corresponding speed and location, and other data associated with the vehicle.

A need, however, exists for systems and methods for determining driving or moving violations by a user of a GPS receiver. In particular, a need exists for determining a speed limit violation by the user of the GPS receiver. Further, a need exists for systems and methods for providing alerts to interested parties that the user is violating the speed limit. Moreover, a need exists for systems and methods to provide alerts of a change in speed limit between adjacent roadway segments.

SUMMARY

Implementations are directed to systems and methods for determining a speed limit violation by a vehicle. According to implementations in one regard, a locator device configured to receive location coordinates is provided. Further, a vehicle coupled to the locator device is also provided. In operation, a speed of the vehicle is determined based on the location coordinates or provided by an engine control module. Platforms and techniques according to various implementations of the present teachings can identify a speed limit of a roadway on which the vehicle is traveling based on the location coordinates. The systems and methods can compare the speed of the vehicle to the speed limit of the roadway. Various implementations further relate to systems and methods for providing alerts to interested parties of a speed limit violation.

BRIEF DESCRIPTION OF THE DRAWINGS

The accompanying drawings, which are incorporated in and constitute a part of this specification, illustrate implementations of the present disclosure and together with the description, serve to explain the implementations.

DETAILED DESCRIPTION

Figure 1:
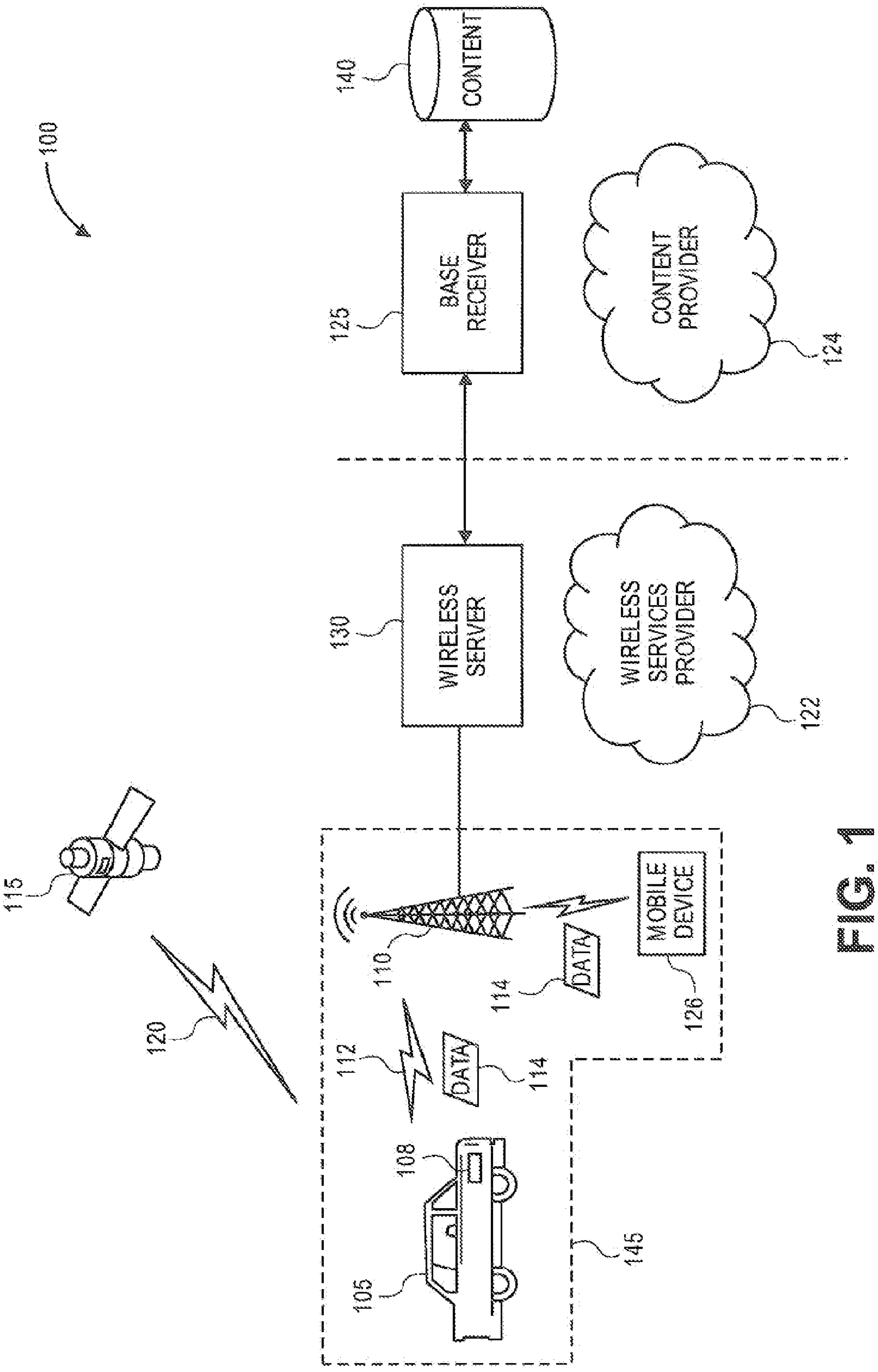
FIG. 1 illustrates a functional block diagram of an exemplary communication network.

Implementations are directed towards systems and methods for determining a speed limit violation by a vehicle. The systems and methods can use received GPS coordinates and roadway data to determine whether a vehicle is exceeding the speed limit for a specific segment or stretch of roadway on which the vehicle is traveling. Systems and methods according to the present teachings can be implemented as software or hardware on new or existing locator devices, on new or existing base receivers, or on any other components configured to perform the systems and methods described herein. It should be appreciated that the velocity of the vehicle can be determined by implementations as described herein, or by any known implementations such as, for example, by the engine control module measuring the rotations of the tires or axles of the vehicle.

Locator devices as described herein can be understood to be any device that can receive GPS signals from one or more GPS satellites for the purpose of determining or estimating the present location of the locator device. Further, the locator devices can be any device capable of cellular, wireless, or satellite communication. Moreover, the locator devices can connect to any storage, hardware, software, or logic for communicating or performing the implementations as described herein. Base receivers as described herein can be understood to be any hardware, software, or logic capable of receiving location data from the locator devices. The base receivers can be in communication with the locator devices via, for example, a cellular or wireless connection. Base receivers can be deployed in any location and can send and receive data to and from the locator de vices over a cellular, wireless, or satellite network.

The locator device can be coupled to, located on, or connected to any vehicle capable of a navigating or traveling a roadway. When the locator device receives a GPS signal from, for example, a GPS satellite, the locator device can transfer the GPS signal or data associated with the GPS signal to the base receiver via a cellular, wireless, or satellite network connection. The base receiver can be configured to store data associated with roadways. For example, the data receiver can include the locations of particular segments of roadway, the speed limits associated with particular segments of roadway, and the speed limit for a certain vehicle type on the particular segment of roadway. The base receiver can be configured to calculate the speed of the vehicle using the received GPS data. The base receiver can further be configured to compare the speed of the vehicle to the speed limit of the corresponding roadway on which the vehicle is traveling to determine whether the vehicle is exceeding the speed limit.

In implementations, the locator device can be configured to store the data associated with the roadways. The locator device can be configured to calculate the speed of the vehicle using the received GPS data. The locator device can further be configured to compare the speed of the vehicle to the speed limit of the corresponding roadway on which the vehicle is traveling to determine whether the vehicle is exceeding the speed limit. It will be appreciated that any calculating, receiving, comparing, notifying, registering, storing, and/or similar operations associated with the implementations described herein can be performed by a locator device, by a base receiver, or by servers or other entities or logic capable of receiving or transferring data within the network.

In implementations, the base receiver and the locator device can be configured to provide an alert or notification of a speed limit violation to interested parties such as, for example, the driver of the vehicle, a manager of a fleet of vehicles, and any other interested party. For example, a fleet manager can be remotely notified if a vehicle in the fleet is exceeding the speed limit. Further, for example, the driver of the vehicle can be alerted if the driver is operating the vehicle in excess of the speed limit. In implementations, the base receiver and the locator device can be configured to provide a notification to the driver when the vehicle enters a road segment which has a speed limit different than the road segment on which the vehicle was previously traveling.

The alert or notification can be provided over a cellular network, a satellite network, a personal area network, a local area network, a metropolitan area network, a wide area network, the Internet, an intranet, an extranet, a virtual private network, a peer-o-peer network, or a wireless self-configuring network. The notification can be, for example, a visual or audio signal, a text message, an email, a component of a webpage, or any other form of data capable of informing a party of a speed limit violation. In implementations, the notification can be provided to devices such as, for example, a user interface, a mobile device, a PC, or any other device or hardware capable of receiving the notification.

In implementations, a trigger parameter can be set to control when the notification is sent to interested parties. For example, the trigger parameter can be a value above or below the speed limit of a particular segment of roadway, and can trigger the notification to be sent if the vehicle is traveling at a speed greater than the value. For further example, the trigger parameter can be a specified amount of time and can trigger the notification to be sent if the vehicle is traveling over the speed limit for that specified amount of time.

Reference will now be made in detail to exemplary implementations of the disclosure, an example of which is illustrated in the accompanying drawings. Wherever possible, the same reference names and numbers will be used throughout the drawings to refer to the same or like parts.

In the following description, reference is made to the accompanying drawings that form a par thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

FIG. 1 illustrates a block diagram of an exemplary communication network 100 consistent with various implementations. As shown in FIG. 1, communication network 100 can include a vehicle 105, a satellite 115, and a satellite interface 120. Vehicle 105 can be configured with a GPS receiver 108 and can be a truck, car, SUV, van, motorcycle, and any other vehicle capable of traveling on a roadway. Satellite 115 can be configured to broadcast Global Positioning System (GPS) coordinates, and GPS receiver 108 can be configured to receive and track the GPS coordinates via satellite interface 120.

Communication network 100 can further include a wireless services provider 122. Wireless services provider 122 can provide cellular telephony or other digital communications services to users of mobile devices, such as GPS receiver 108 or other mobile devices 126. In implementations, mobile devices 126 can be a cellular phone, a laptop, a PDA, or a mobile messaging device. Wireless services provider 122 can be a cellular telephone service provider, a personal communications services (PCS) provider, or a provider of other wireless services. Wireless services provider 122 can operate a wireless server 130 and a set of base stations 110. As shown in FIG. 1 GPS receiver 108 and mobile devices 126 can communicate with wireless server 130 using a client server software architecture over a wireless interface 112 through set of base stations 110. GPS receiver 108, mobile devices 126, wireless interface 112, and set of base stations 110 can together comprise a wireless communication network 145 consistent with various implementations described herein.

Set of base stations 110 can be configured to provide communication service within a service area, or any zone, boundary, or other area within which set of base stations 110 can establish communications service with GPS receiver 108 and mobile devices 126. Communication service among GPS receiver 108, mobile devices 126, and set of base stations 110 can be established if GPS receiver 108 or mobile devices 126 are located within the service area of base stations 110. Set of base stations 110 can be configured to send and receive data 114 to and from GPS receiver 108 and mobile devices 126. Data 114 can comprise the GPS coordinates received from satellite 115, data resulting from any calculations or comparisons as described in implementations contained herein, data corresponding to speed limits of particular roadways, or any other data defined by, related to, or modified by any implementations described herein.

Communication network 100 can further include a content provider 124 that can be an internet service provider (ISP) or other provider of digital content. Content provider 124 may operate a base receiver 125 for providing access to digital content 140 stored in computer readable media. Wireless services provider 122 can be linked to content provider 124 through any appropriate communications link, such as a WAP gateway, a socket connection, etc. In an implementation, wireless services provider 122 may retrieve digital content 140 from base receiver 125 over a communications link and provide digital content 140 to GPS receiver 108 and mobile devices 126 over wireless interface 112. However, it is to be understood that the present disclosure is not limited to such an arrangement, and that GPS receiver 108 and mobile devices 126 can obtain digital content 140 by other mechanisms. For example, GPS receiver 108 and mobile devices 126 may be linked to content provider 124 by a land line and, in some implementations, some or all of digital content 140 may be stored in a memory of GPS receiver 108 or mobile devices 126.

Digital content 140 provided by content provider 124 may be any type of content, such as roadway location information, speed limit data associated with the roadways, geographic data tags, data associated with geographic locations and/or regions, etc., suitable for access and use by GPS receiver 108 and mobile devices 126. Digital content 140 provided by content provider 124 may also be any type of content specific to users of GPS receiver 108 and mobile devices 126, such as maps or lists of the users' past and present geographic locations, vehicle speed and speed limit data, geographic locations similar to the users' present geographic locations, and geographic locations of the users' friends and other shared data accessible to GPS receiver 108 or mobile devices 126.

Figure 2:
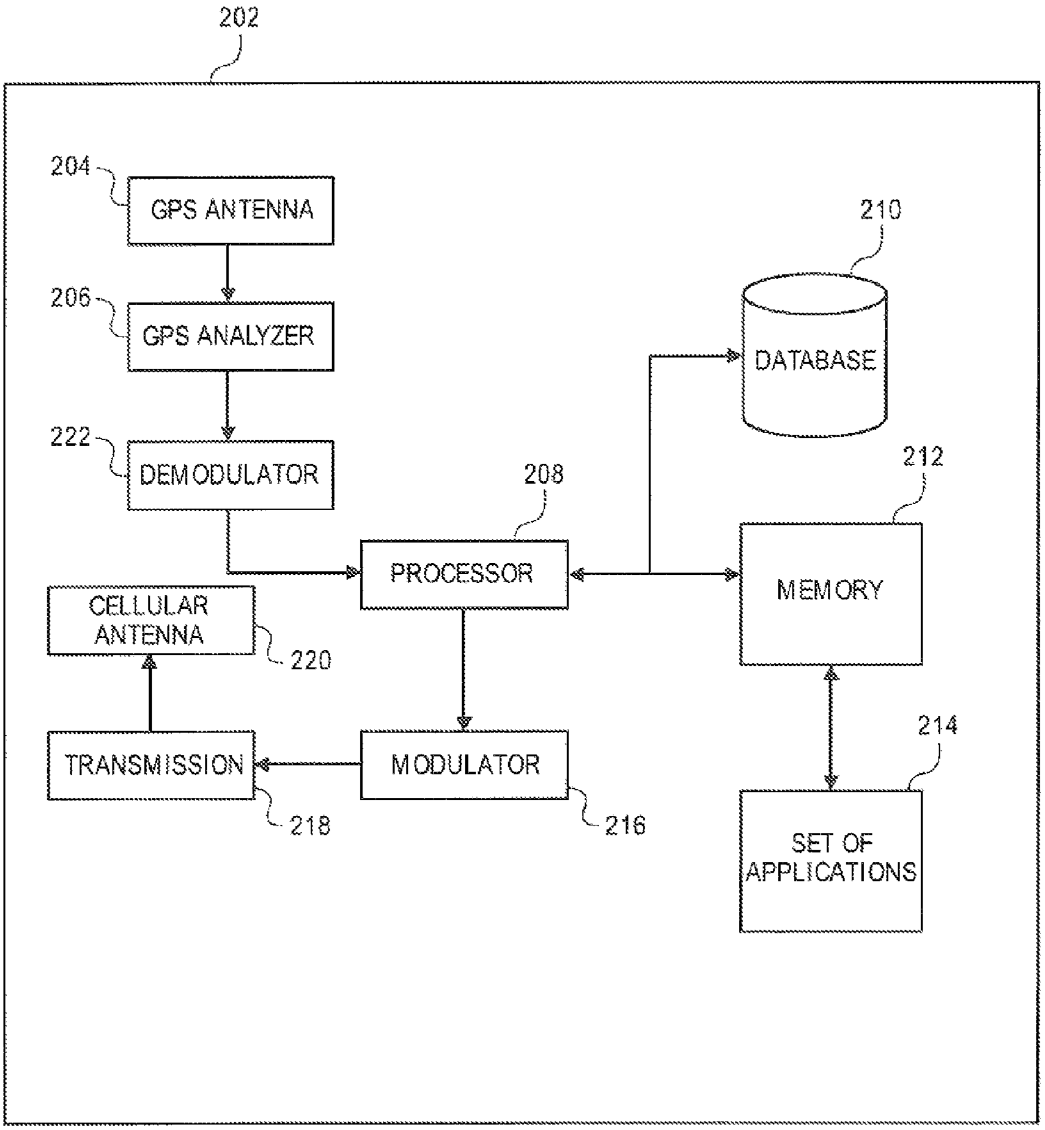
FIG. 2 illustrates an exemplary hardware configuration of a locator device.

FIG. 2 illustrates an exemplary hardware configuration of a GPS receiver or other locator device 202, consistent with various implementations. GPS receiver 202 can be configured to be coupled to, located on, or connected to vehicle 105. GPS receiver 202 can include at least one GPS antenna 204 (e.g., a transmission receiver or group of such receivers comprising an input interface) that can act as a wave guide for receipt of wireless GPS position coordinates or signals, and a GPS analyzer 206, which performs actions (e.g., filters, amplifies, down-converts, etc.) on the received signals. GPS antenna 204 and GPS analyzer 206 can also be coupled with a demodulator 222 that can demodulate received signals and provide them to a processor 208 for processing. GPS receiver 202 can additionally include memory 212 that is operatively coupled to processor 208 and that can store data to be transmitted, received, and the like.

Processor 208 can analyze information received by GPS antenna 204 and/or a user input interface (not depicted) of GPS receiver 202, and/or generate information for transmission by a transmitter 218 and a cellular antenna 220 via a modulator 216. Processor 208 can connect to a database 210 that can store location data including, for example, roadway location information, speed limit data associated with the roadways, geographic data tags, data associated with geographic locations and/or regions, etc. Additionally, processor 208 can control and/or reference one or more resources or components (e.g., 222, 210, 214, 216, 218) of GPS receiver 202. Additionally, processor 208 can execute one or more set of applications 214 or other software, modules, applications, logic, code, or the like, to perform calculations associated with the implementations described herein.

Figure 3:
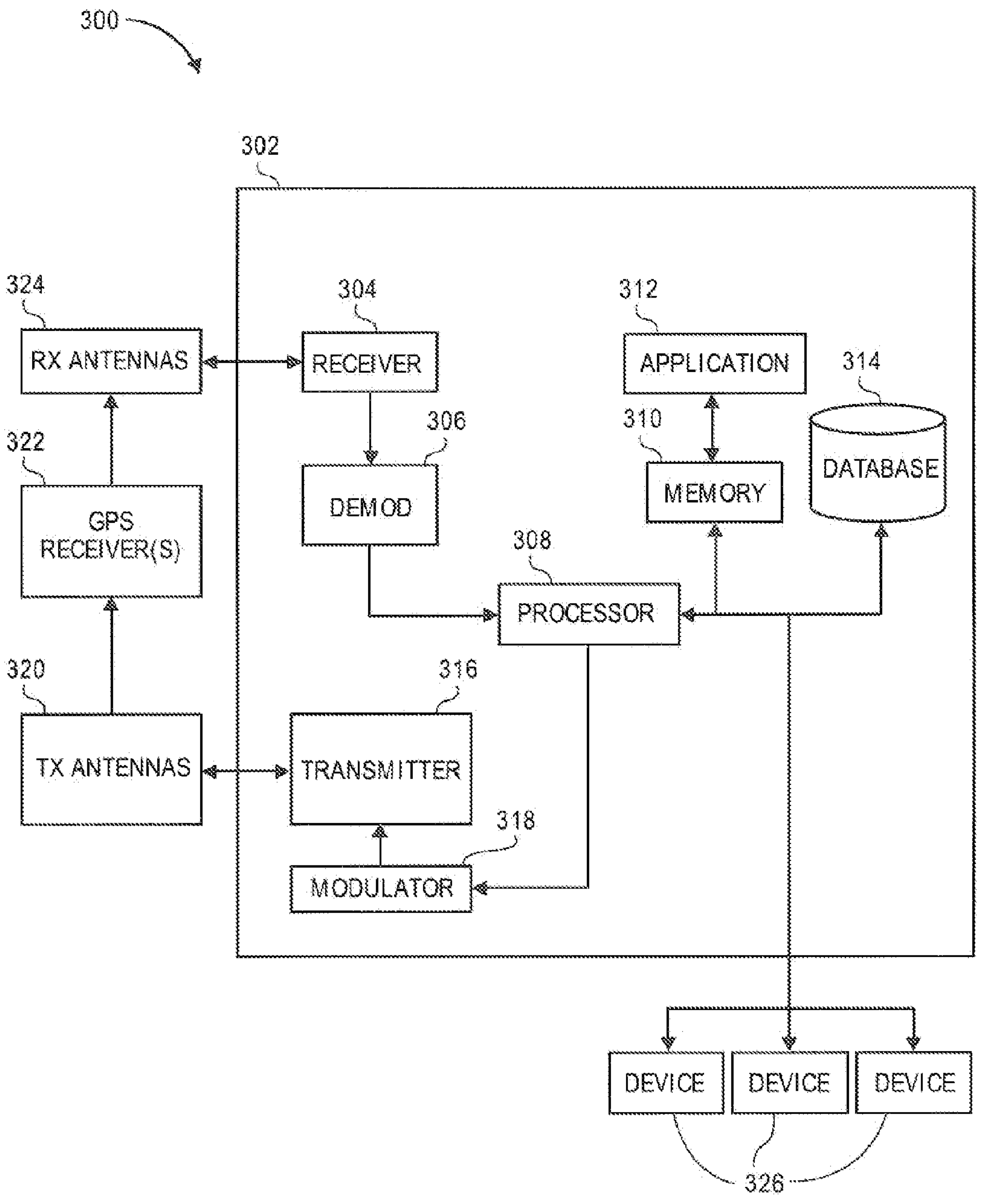
FIG. 3 illustrates an exemplary hardware configuration of a base receiver.

FIG. 3 illustrates an exemplary hardware configuration of a system 300 including a base receiver 302 according to various implementations. System 300 comprises base receiver 302 (e.g., access point, data storage, cell tower, etc.) with a receiver 304 that receives signal(s) from one or more GPS receivers 322 through one or more receive antennas 324, and a transmitter 316 that transmits to the one or more GPS receivers 322 through a transmit antenna 320. Receiver 304 can receive information from one or more receive antennas 324 and be operatively associated with a demodulator 306 that demodulates received information.

A processor 308 can analyze demodulated signals provided by demodulator 306. Processor 308 further couples to a modulator 318 and a memory 310 that can store one or more applications 312 that can execute, support, facilitate and/or participate in calculation and communication activities as described in implementations contained herein. A database 314 can be coupled to processor 308 and memory 310 and can be configured to store location data including, for example, roadway location information, speed limit data associated with the roadways, geographic data tags, data associated with geographic locations and/or regions, etc. Applications 312 can be configured to, for example, compute the speed of vehicles by using the data received from GPS receivers 322 coupled to the vehicles and determine any speed limit violations by comparing the speeds of the vehicles to the speed limit data stored in database 314, in accordance with implementations described herein. Applications 312 can be configured to communicate speed data and notification data associated with a speed limit violation with memory 310. Processor 308 can be configured to provide data or notifications relating to the data to one or more mobile devices 326 over a cellular network, a satellite network a personal area network, a local area network, a metropolitan area network, a wide area network, the Internet an intranet, an extranet, a virtual private network, a peer-to-peer network, or a wireless self-configuring network.

Figure 4:
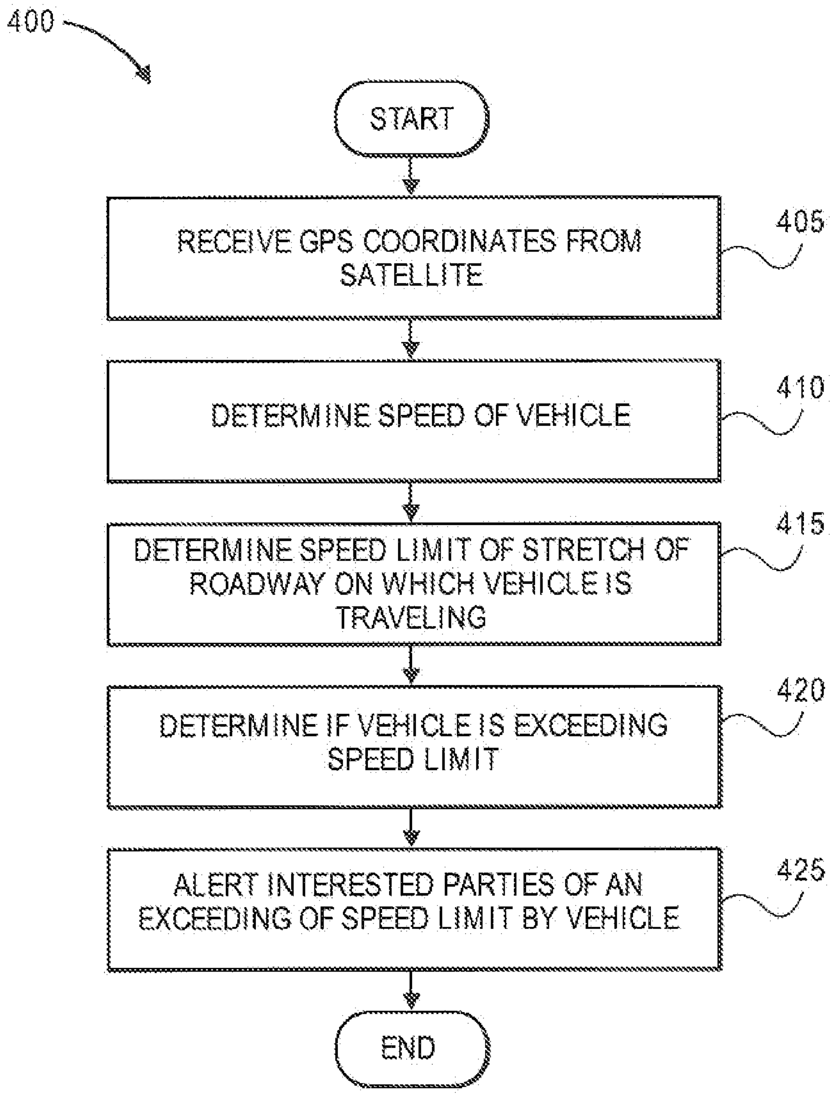
FIG. 4 is a flow diagram illustrating a process of determining a speed limit violation by a vehicle.

FIG. 4 is a flow diagram illustrating a process 400 of determining a speed limit violation by a vehicle. Process 400 can be performed by a GPS receiver that can be coupled to, located on, or otherwise connected to a vehicle. In implementations, process 400 can be performed by any locator device that can receive location data or by any logic connected to a locating device. It should be apparent to those of ordinary skill in the art that the diagram depicted in FIG. 4 represents a generalized illustration and that other processing may be added or existing processing can be removed or modified.

Process 400 begins when the GPS receiver receives GPS coordinates from a GPS satellite, in 405. The GPS coordinates can correspond to the location of the GPS receiver and the corresponding vehicle to which it is coupled. The GPS receiver determines the speed of the vehicle using the received GPS coordinates, in 410. For example, the GPS receiver can calculate the speed of the vehicle using conventional methods such as computing movement per unit time, computing the doppler shift in the pseudo range signals from the satellites, using algorithms in the Kalman filter, and using other algorithms. Further, for example, the speed of the vehicle can be determined using other known methods such as, for example, the engine control module measuring the rotations of the tires and axles of the vehicle.

The GPS receiver identifies or determines the speed limit corresponding to the segment or stretch of roadway on which the vehicle is traveling and/or to the type of the vehicle, in 415. In implementations, the GPS receiver can access a database containing the locations of road segments of a particular area and the corresponding speed limits for one or all vehicle types for the road segments. For example, different vehicle types can have different corresponding speed limits for a particular road segment. From the information in the database, and the location and type of the vehicle, the GPS receiver can determine the corresponding speed limit for the vehicle for the corresponding road segment.

The GPS receiver determines if the vehicle is exceeding the speed limit, in 420. For example, the GPS receiver can compare the vehicle's speed to the speed limit for the corresponding road segment on which the vehicle is traveling. The GPS receiver can alert interested parties as to whether the vehicle is exceeding the speed limit, in 425. For example, the GPS receiver can alert the driver of the vehicle, a fleet manager, or any other interested party via a display screen, an audible alert, a vibration, or some other visual, audio, or electronic notification. In implementations, the GPS receiver can provide an alert upon the vehicle entering a segment of roadway having a speed limit different from a speed limit of a segment of roadway on which the vehicle previously traveled. In further implementations, the GPS receiver can alert other interested parties via the cellular or wireless network connection as described herein.

Figure 5:
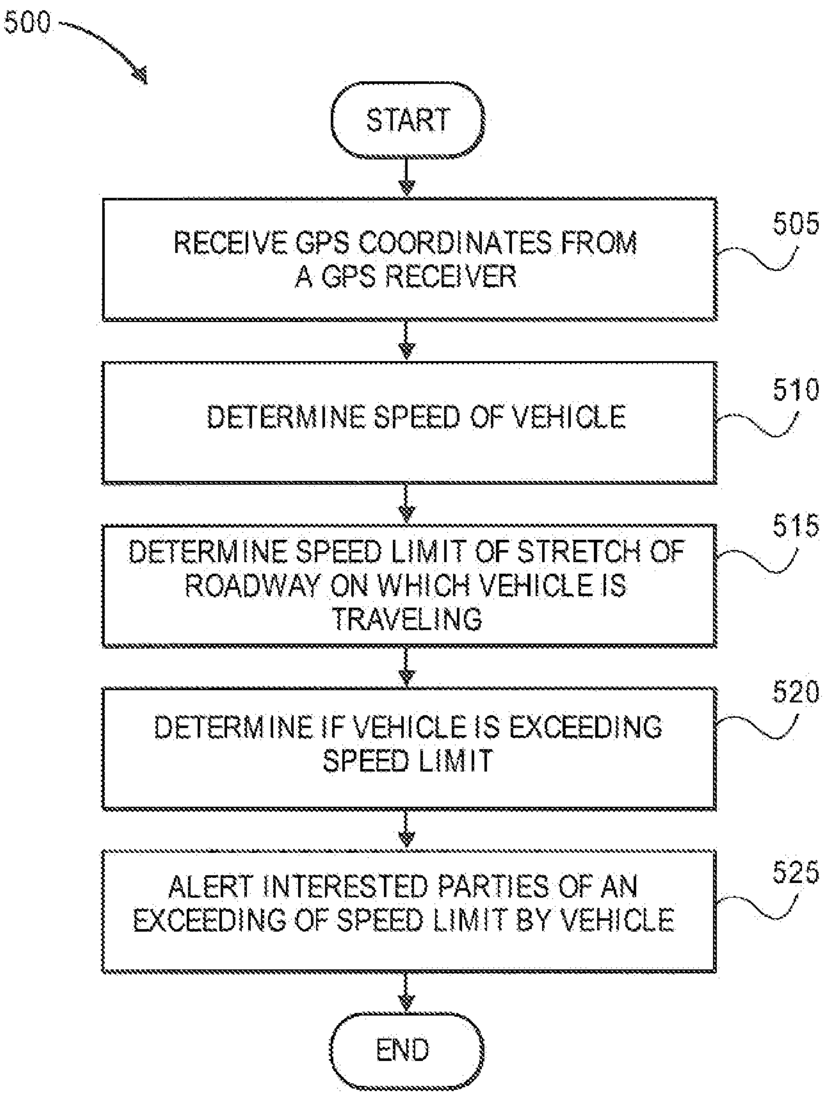
FIG. 5 is a flow diagram illustrating a process of determining a speed limit violation by a vehicle.

FIG. 5 is a flow diagram illustrating a process 500 of determining a violation of a speed limit by a vehicle. Process 500 can be performed by a component that can receive location data from a GPS receiver such as, for example, a base receiver. In implementations, process 500 can be performed by any hardware, software, or logic that can receive location data. It should be apparent to those of ordinary skill in the art that the diagram depicted in FIG. 5 represents a generalized illustration and that other processing may be added or existing processing can be removed or modified.

Process 500 begins when the base receiver receives GPS coordinates from a GPS receiver, in 505. For example, the base receiver can receive the GPS coordinates over a cellular or wireless communications network. The GPS coordinates can correspond to the location of the GPS receiver and the corresponding vehicle to which the GPS receiver is coupled. The base receiver determines the speed of the vehicle using the received GPS coordinates, in 510. For example, the base receiver can calculate the speed using conventional methods such as computing movement per unit time, computing the doppler shift in the pseudo range signals from the satellites, using algorithms in the Kalman filter, and using other algorithms.

The base receiver determines the speed limit corresponding to the segment of roadway on which the vehicle is traveling and/or to the type of the vehicle, in 515. In implementations, the base receiver can access a database containing the locations of road segments of a particular area and the corresponding speed limits for one or all vehicle types for the road segments. For example, different vehicle typos can have different corresponding speed limits for a particular road segment. From the information in the database, and the location and type of the vehicle, the base receiver can determine the corresponding speed limit for the vehicle on the corresponding road segment.

The base receiver determines if the vehicle is exceeding the speed limit, in 520. For example, the base receiver can compare the vehicle's speed to the speed limit for the corresponding road segment on which the vehicle is traveling. The base receiver can alert interested parties whether the vehicle is exceeding the speed limit, in 525. For example, the base receiver can send an alert to the driver of the vehicle, a fleet manager, or any other interested party. The alert can be any notification or signal capable of alerting the interested party such as, for example, a display screen, an audible noise, a vibration, or some other visual, electronic, or audio notification. In implementations, the base receiver can provide an alert upon the vehicle entering a segment of roadway having a speed limit different from a speed limit of a segment of roadway on which the vehicle previously traveled. In further implementations, the base receiver can alert other interested parties via a cellular network, a satellite network, a personal area network, a local area network, a metropolitan area network, a wide area network, the Internet, an intranet, an extranet, a virtual private network, a peer-to-peer network, and a wireless self-configuring network.

Figure 6:
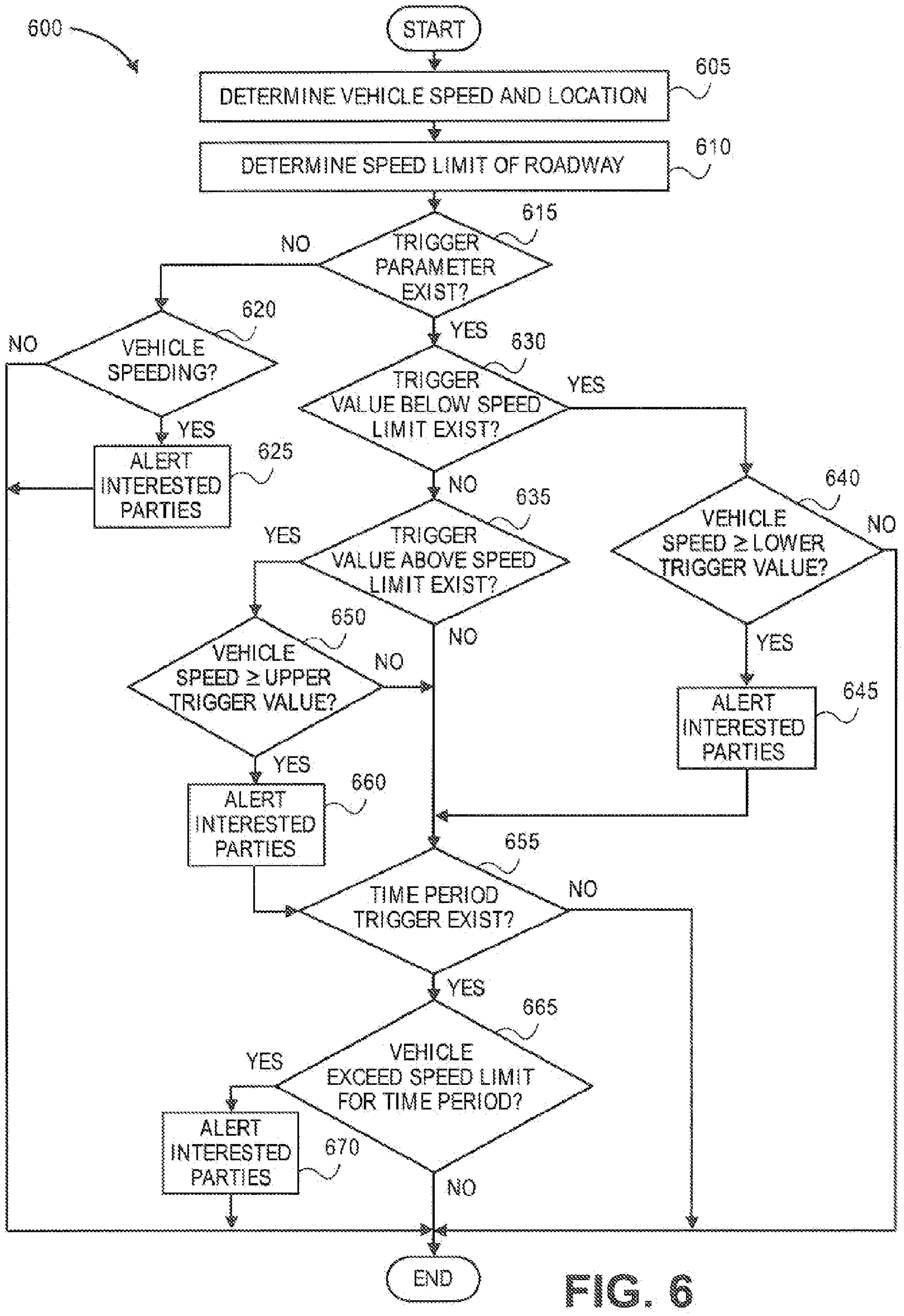
FIG. 6 is a flow diagram illustrating a process of altering of a speed limit violation by a vehicle using trigger parameters.

FIG. 6 is a flow diagram illustrating a process 600 of utilizing alert parameters during the determination of a violation of a speed limit by a vehicle. Process 600 can be performed by a component that can receive location data such as, for example, a GPS receiver or a base receiver. In implementations, process 600 can be performed by any hardware, software, or logic that can receive location data as described herein. It should be apparent to those of ordinary skill in the art that the diagram depicted in FIG. 6 represents a generalized illustration and that other processing may be added or existing processing can be removed or modified.

Process 600 begins when the receiver determines the speed and location of a vehicle, as described in implementations contained herein, in 605. The receiver determines the speed limit of the roadway on which the vehicle is traveling, as described in implementations contained herein, in 610. The receiver determines if one or more trigger parameters exist, in 615. For example, the trigger parameter can be a specified value above or below the speed limit, or a specified period of time. In implementations, the trigger parameter can be programmed into the logic of the receiver, or can be set or modified by an operator of the receiver.

If a trigger parameter does not exist, the receiver determines if the vehicle is exceeding the speed limit, in 620. For example, the receiver can compare the speed of the vehicle to the speed limit corresponding to the roadway on which the vehicle is traveling. If the vehicle is not speeding, process 600 ends. If the vehicle is speeding, the receiver alerts any interested parties, as described in implementations contained herein, in 625, and process 600 proceeds to end.

If a trigger parameter exists, the receiver determines if there exists a value below the speed limit as one of the one or more trigger parameters, in 630. If there does not exist a value below the speed limit as a trigger parameter, process 600 proceeds to 635. If there does exist a value below the speed limit as a trigger parameter, the receiver determines if the vehicle speed is greater than or equal to the speed limit minus the value, in 640. If yes, then the receiver alerts any interested parties as described in implementations contained herein, in 645. For example, if the vehicle speed is 56 miles/hour, the speed limit is 60 miles/hour, and the lower trigger value is 5, then the receiver can alert any interested parties that the vehicle is traveling at a speed within 5 miles/hour of the speed limit. Process then proceeds to 655. If the vehicle speed is less than the speed limit minus the value, then process 600 ends.

The receiver determines if there exists a value above the speed limit as one of the one or more trigger parameters, in 635. If there does exist a value above the speed limit as a trigger parameter, the receiver determines if the vehicle speed is greater than or equal to the speed limit plus the value, in 650. If yes, then the receiver alerts any interested parties, as described in implementations contained herein, in 660. For example, if the vehicle speed is 66 miles/hour, the speed limit is 60 miles/hour, and the upper trigger value is 5, then the receiver can alert any interested parties that the vehicle is traveling at a speed greater than or equal to 5 miles/hour over the speed limit. Process then proceeds to 655. If the vehicle speed is less than the speed limit plus the value, then process 600 proceeds to 655.

The receiver determines if there exists a specified period of time as one of the one or more trigger parameters, in 655. For example, the trigger parameter can be a specified period of time in which the vehicle can be exceeding the speed limit. If there does not exist a specified period of time as a trigger parameter, then process 600 ends. If there does exist a specified period of time as a trigger parameter, then receiver determines if the vehicle has continuously exceeded the speed limit for the specified period of time, in 665. If yes, then the receiver alerts any interested parties, as described in implementations contained herein, in 670. For example, if the speed limit is 60 miles/hour, the specified period of time is 30 seconds, and the vehicle has traveled at speeds in excess of 60 miles/hour for a continuous 30-second period of time, then the receiver can alert any interested parties that the vehicle has continuously exceeded the speed limit for 30 seconds. Process 600 then proceeds to end. If the vehicle has not continuously exceeded the speed limit for the specified period of time, then process 600 ends.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of determining a speed limit violation by a vehicle, comprising:

receiving location coordinates of the vehicle from a locator device coupled to the vehicle;

determining a speed of the vehicle based on measurements from an engine control module;

determining a vehicle type of the vehicle;

based on the location coordinates, identifying, by the locator device, a speed limit for the vehicle type of a roadway on which the vehicle is traveling;

comparing, by the locator device, the speed of the vehicle to the speed limit of the roadway and a value above the speed limit of the roadway;

determining, by the locator device, a speed limit violation when the speed of the vehicle continuously exceeds the speed limit of the roadway and the value above the speed limit of the roadway for a period of time; and providing, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

2. The method of claim 1, wherein the locator device comprises a GPS receiver.

3. The method of claim 1, further comprising:

identifying an alert parameter; and determining a triggering of the alert parameter.

4. The method of claim 1, wherein the location coordinates are received over one of a cellular network, a wireless network or a satellite network.

5. The method of claim 1, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

6. The method of claim 1, wherein the speed limit of the roadway is stored in memory.

7. The method of claim 1, wherein the measurements from an engine control module include at least one of: rotations of tires on the vehicle or rotations of axles of the vehicle.

8. The method of claim 1, wherein the determining the speed of the vehicle further comprises determining the speed of the vehicle based on the location coordinates.

9. The method of claim 1, wherein one of the one or more remote entities comprises a device associated with a manager of a fleet of vehicles, and wherein the vehicle is part of the fleet of vehicles.

10. The method of claim 1, wherein determining the speed limit violation further comprises:

continuing to monitor the speed of the vehicle when the speed of the vehicle does not continuously exceed the speed limit for the period of time; and providing the alert of the speed limit violation when the speed of the vehicle exceeds the speed limit for the period of time.

11. The method of claim 1, further comprising:

providing a notification to a driver of the vehicle when the vehicle enters a road segment which has a speed limit different than the road segment on which the vehicle was previously traveling.

12. The method of claim 1, wherein different vehicle types have different corresponding speed limits for the roadway.

13. A locator device coupled to the vehicle for determining a speed limit violation by a vehicle, comprising:

a wireless interface; and a processor, communicating with the wireless interface, the processor being configured to:

receive location coordinates of the vehicle;

determine a speed of the vehicle based on measurements from an engine control module;

determine a vehicle type of the vehicle;

based on the location coordinates, identify a speed limit for the vehicle type of a roadway on which the vehicle is traveling;

compare the speed of the vehicle to the speed limit of the roadway and a value above the speed limit of the roadway;

determine a speed limit violation when the speed of the vehicle continuously exceeds the speed limit of the roadway and the value above the speed limit of the roadway for a period of time; and provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

14. The system of claim 13, wherein the locator device is further configured to provide an alert upon the vehicle entering a segment of roadway having a speed limit different from a speed limit of a segment of roadway on which the vehicle previously traveled.

15. The system of claim 13, wherein the locator device is further configured to— identify an alert parameter; and determine a triggering of the alert parameter.

16. The system of claim 13, wherein the location coordinates are received over one of a cellular network, a wireless network or a satellite network.

17. The system of claim 13, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

18. The system of claim 13, the measurements from an engine control module include at least one of: rotations of tires on the vehicle or rotations of axles of the vehicle.

19. The system of claim 13, wherein the server is further configured to determine the speed of the vehicle based on the location coordinates.

20. The system of claim 13, wherein one of the one or more remote entities comprises a device associated with a manager of a fleet of vehicles, and wherein the vehicle is part of the fleet of vehicles.

21. The system of claim 13, wherein the processor is further configured to:

continue to monitor the speed of the vehicle when the speed of the vehicle does not continuously exceed the speed limit for the period of time; and provide the alert of the speed limit violation when the speed of the vehicle exceeds the speed limit for the period of time.

22. A system for determining a speed limit violation by a vehicle coupled to a locator device, comprising:

means for providing a wireless interface to the locator device; and means for providing data to the locator device, communicating with the means for providing the wireless interface, the means for providing data being configured to— receive location coordinates of the vehicle;

determine a speed of the vehicle based on measurements from an engine control module;

determine a vehicle type of the vehicle;

based on the location coordinates, identify a speed limit for the vehicle type of a roadway on which the vehicle is traveling;

compare the speed of the vehicle to the speed limit of the roadway and a value above the speed limit of the roadway;

determine a speed limit violation when the speed of the vehicle continuously exceeds the speed limit of the roadway and the value above the speed limit of the roadway for a period of time; and provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

23. The system of claim 22, wherein the means for providing data is further configured to provide an alert upon the vehicle entering a segment of roadway having a speed limit different from a speed limit of a segment of roadway on which the vehicle previously traveled.

24. The system of claim 22, wherein the means for providing is further configured to:

identify an alert parameter; and determine a triggering of the alert parameter.

25. The system of claim 22, wherein the location coordinates are received over one of a cellular network, a wireless network or a satellite network.

26. The system of claim 22, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

27. The system of claim 22, the measurements from an engine control module include at least one of: rotations of tires on the vehicle or rotations of axles of the vehicle.

28. The system of claim 22, wherein the means for determining the speed of the vehicle further comprise means for determining the speed of the vehicle based on the location coordinates.

29. The system of claim 22, wherein one of the one or more remote entities comprises a device associated with a manager of a fleet of vehicles, and wherein the vehicle is part of the fleet of vehicles.

30. A computer program product, comprising:

a non-transitory computer-readable medium comprising:

at least one instruction for causing a computer to receive location coordinates of a vehicle from a locator device coupled to the vehicle;

at least one instruction for causing a computer to determine a speed of the vehicle based on measurements from an engine control module;

at least one instruction for causing a computer to determine a vehicle type of the vehicle;

at least one instruction for causing a computer to, based on the location coordinates, identify, by the locator device, a speed limit for the vehicle type of a roadway on which the vehicle is traveling;

at least one instruction for causing a computer to compare, by the locator device, the speed of the vehicle to the speed limit of the roadway and a value above the speed limit of the roadway;

at least one instruction for causing a computer to determine, by the locator device, a speed limit violation when the speed of the vehicle continuously exceeds the speed limit of the roadway and the value above the speed limit of the roadway for a period of time; and at least one instruction for causing a computer to provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

31. The computer program product of claim 30, wherein the computer-readable medium further comprises at least one instruction for causing a computer to provide an alert upon the vehicle entering a segment of roadway having a speed limit different from a speed limit of a segment of roadway on which the vehicle previously traveled.

32. The computer program product of claim 30, wherein the computer-readable medium further comprises at least one instruction for causing a computer to identify an alert parameter; and at least one instruction for causing a computer to determine a triggering of the alert parameter.

33. The computer program product of claim 30, wherein the location coordinates are received over one of a cellular network, a wireless network or a satellite network.

34. The computer program product of claim 30, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

35. The computer program product of claim 30, the measurements from an engine control module include at least one of: rotations of tires on the vehicle or rotations of axles of the vehicle.

36. The computer program product of claim 30, wherein the computer-readable medium further comprises at least one instruction for causing a computer to determine the speed of the vehicle based on the location coordinates.

37. The computer program product of claim 30, wherein one of the one or more remote entities comprises a device associated with a manager of a fleet of vehicles, and wherein the vehicle is part of the fleet of vehicles.

38. A method of determining a speed limit violation by a vehicle coupled to a locator device, comprising:

receiving location coordinates of the vehicle from at least one GPS satellite;

determining a speed of the vehicle based on measurements from an engine control module;

determining a vehicle type of the vehicle;

based on the location coordinates, identifying, by the locator device, a speed limit for the vehicle type of a roadway on which the vehicle is traveling;

comparing, by the locator device, the speed of the vehicle to the speed limit of the roadway and a value above the speed limit of the roadway;

determining, by the locator device, speed limit violation when the speed of the vehicle continuously exceeds the speed limit of the roadway and the value above the speed limit of the roadway for a period of time; and providing, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

39. The method of claim 38, further comprising:

providing the location coordinates of the vehicle to a receiver over one of a cellular, wireless network or satellite network.

40. The method of claim 38, further comprising:

identifying an alert parameter; and determining a triggering of the alert parameter.

41. The method of claim 38, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

42. The method of claim 38, wherein the speed limit of the roadway is stored in memory.

43. The method of claim 38, wherein the measurements from an engine control module include at least one of: rotations of tires on the vehicle or rotations of axles of the vehicle.

44. The method of claim 38, wherein the determining the speed of the vehicle further comprises determining the speed of the vehicle based on the location coordinates.

45. The method of claim 38, wherein determining the speed limit violation further comprises:

continuing to monitor the speed of the vehicle when the speed of the vehicle does not continuously exceed the speed limit for the period of time; and providing the alert of the speed limit violation when the speed of the vehicle exceeds the speed limit for the period of time.

46. A locator device, comprising:

a wireless interface; and a processor, communicating with the wireless interface, the processor being configured to— receive location coordinates of a vehicle coupled to the locator device from at least one GPS satellite;

determine a speed of the vehicle based on measurements from an engine control module:

determine a vehicle type of the vehicle;

based on the location coordinates, identify a speed limit for the vehicle type of a roadway on which the vehicle is traveling;

compare the speed of the vehicle to the speed limit of the roadway and a value above the speed limit of the roadway;

determine a speed limit violation when the speed of the vehicle continuously exceeds the speed limit of the roadway and the value above the speed limit of the roadway for a period of time; and provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

47. The locator device of claim 46, wherein the processor is further configured to provide the location coordinates of the vehicle to a receiver over one of a cellular or wireless network.

48. The locator device of claim 46, wherein the processor is further configured to— identify an alert parameter; and determine a triggering of the alert parameter.

49. The locator device of claim 46, wherein the alert is provided to at least one of the one or more remote entities over one of a cellular network, a satellite network, a personal area network, a local area network, a metropolitan area network, a wide area network, the Internet, an intranet, an extranet, a virtual private network, a peer-to-peer network, and a wireless self-configuring network.

50. The locator device of claim 46, wherein the speed limit of the roadway is stored in memory.

51. The locator device of claim 46, wherein the measurements from an engine control module include at least one of: rotations of tires on the vehicle or rotations of axles of the vehicle.

52. The locator device of claim 46, wherein the processor is further configured to determine the speed of the vehicle based on the location coordinates.

53. The system of claim 46, wherein the processor is further configured to:

continue to monitor the speed of the vehicle when the speed of the vehicle does not continuously exceed the speed limit for the period of time; and provide the alert of the speed limit violation when the speed of the vehicle exceeds the speed limit for the period of time.

54. A system for determining a speed limit violation by a vehicle coupled to a locator device, comprising:

means for providing a wireless interface to the locator device; and means for providing data to the locator device, communicating with the means for providing a wireless interface, the means for providing data being configured to— receive location coordinates of the vehicle from at least one GPS satellite;

determine a speed of the vehicle based on measurements from an engine control module;

determine a vehicle type of the vehicle;

based on the location coordinates, identify a speed limit for the vehicle type of a roadway on which the vehicle is traveling;

compare the speed of the vehicle to the speed limit of the roadway and a value above the speed limit of the roadway;

determine a speed limit violation when the speed of the vehicle continuously exceeds the speed limit of the roadway and the value above the speed limit of the roadway for a period of time; and provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

55. The system of claim 54, wherein the means for providing data is further configured to provide the location coordinates of the vehicle to a receiver over one of a cellular or wireless network.

56. The system of claim 54, wherein the means for providing data is further configured to— identify an alert parameter; and determine a triggering of the alert parameter.

57. The system of claim 54, wherein the alert is provided to at least one of the one or more remote entities over one of a cellular network, a satellite network, a personal area network, a local area network, a metropolitan area network, a wide area network, the internet, an intranet, an extranet, a virtual private network, a peer-to-peer network, and a wireless self-configuring network.

58. The system of claim 54, the measurements from an engine control module include at least one of: rotations of tires on the vehicle or rotations of axles of the vehicle.

59. The system of claim 54, wherein the means for determining the speed of the vehicle further comprise means for determining the speed of the vehicle based on the location coordinates.

60. A computer program product, comprising:

a non-transitory computer-readable medium comprising:

at least one instruction for causing a computer to receive location coordinates of a vehicle coupled to a locator device from at least one GPS satellite;

at least one instruction for causing a computer to determine a speed of the vehicle based on measurements from an engine control module;

at least one instruction for causing a computer to determine a vehicle type of the vehicle;

at least one instruction for causing a computer to, based on the location coordinates, identify, by the locator device, a speed limit for the vehicle type of a roadway on which the vehicle is traveling;

at least one instruction for causing a computer to compare, by the locator device, the speed of the vehicle to the speed limit of the roadway and a value above the speed limit of the roadway;

at least one instruction for causing a computer to determine, by the locator device, a speed limit violation when the speed of the vehicle continuously exceeds the speed limit of the roadway and the value above the speed limit of the roadway for a period of time; and at least one instruction for causing a computer to provide, by the locator device, an alert of the speed limit violation upon the vehicle entering a segment of the roadway having a speed limit different from a speed limit of a segment of the roadway on which the vehicle previously traveled, wherein the alert is provided to one or more remote entities and the alert includes the speed limit violation and the period of time the vehicle exceeded the speed limit.

61. The computer program product of claim 60, wherein the computer-readable medium further comprises at least one instruction for causing a computer to provide the location coordinates of the vehicle to a receiver over one of a cellular or wireless network.

62. The computer program product of claim 60, wherein the computer-readable medium further comprises at least one instruction for causing a computer to— identify an alert parameter; and determine a triggering of the alert parameter.

63. The computer program product of claim 60, wherein the alert is provided to at least one of the one or more remote entities over one of a cellular network, a satellite network, a personal area network, a local area network, a metropolitan area network, a wide area network, the internet, an intranet, an extranet, a virtual private network, a peer-to-peer network, and a wireless self-configuring network.

64. The computer program product of claim 60, the measurements from an engine control module include at least one of: rotations of tires on the vehicle or rotations of axles of the vehicle.

65. The computer program product of claim 60, wherein the computer-readable medium further comprises at least one instruction for causing a computer to determine the speed of the vehicle based on the location coordinates.

* * * * *